US008746413B2

(12) United States Patent
Schroeder-Brumloop et al.

(10) Patent No.: US 8,746,413 B2
(45) Date of Patent: Jun. 10, 2014

(54) SINGLE BRAKESHOE TEST (ELECTRICAL) FOR ELEVATORS

(75) Inventors: Helmut Lothar Schroeder-Brumloop, Berlin (DE); Pascal Rebillard, Gien (FR); Gerard Sirigu, Gien (FR); Olivier Stanislas Dukacz, Les Choux (FR); Ralph S. Stripling, Berlin (DE); Juan Antonio Illan, Madrid (ES); Jose Sevilleja-Perez, Madrid (ES); Juan Martin, Madrid (ES)

(73) Assignee: Otis Elevator Company, Farmington, CT (US)

( * ) Notice: Subject to any disclaimer, the term of this patent is extended or adjusted under 35 U.S.C. 154(b) by 210 days.

(21) Appl. No.: 12/990,960

(22) PCT Filed: Jun. 3, 2008

(86) PCT No.: PCT/EP2008/004417
§ 371 (c)(1),
(2), (4) Date: Nov. 4, 2010

(87) PCT Pub. No.: WO2009/146717
PCT Pub. Date: Dec. 10, 2009

(65) Prior Publication Data
US 2011/0048863 A1    Mar. 3, 2011

(51) Int. Cl.
*B66B 1/34*    (2006.01)

(52) U.S. Cl.
USPC .......................................... 187/393; 187/288

(58) Field of Classification Search
USPC ......... 187/247, 277, 287, 288, 290, 305, 306, 187/314, 391–393
See application file for complete search history.

(56) References Cited

U.S. PATENT DOCUMENTS 5,199,532 A    4/1993 Suganuma et al.
6,021,872 A    2/2000 Sevilleja et al.
(Continued)

FOREIGN PATENT DOCUMENTS

| EP | 1923345 A1 | 5/2008 |
| WO | 2007020325 A2 | 2/2007 |
| WO | 2007046129 A1 | 4/2007 |

OTHER PUBLICATIONS

International Search Report and Written Opinion of the International Searching Authority for International application No. PCT/EP2008/004417 mailed Jul. 15, 2009.

*Primary Examiner* — Anthony Salata
(74) *Attorney, Agent, or Firm* — Carlson, Gaskey & Olds

(57) ABSTRACT

A control arrangement (100) for an elevator brake, comprises a control circuit (110) adapted to generate, according to a demand for releasing a first braking member of the elevator brake, a first actuating signal and to generate, according to a demand for releasing a second braking member of the elevator brake, a second actuating signal; a first terminal (112) for outputting the first actuating signal to a first electromagnetic actuating means (26) of the elevator brake, a second terminal for outputting the second actuating signal to a second electromagnetic actuating means (30) of the elevator brake; the control arrangement (100) being adapted to allow at least the following modes of operation: A) a normal operation mode in which the first and the second actuating signals are supplied synchronously to the first and second electromagnetic actuation means (26, 30), respectively, and B) a single braking member test operation mode, in which one of the first and second actuating signals is supplied to the respective one of the first and second electromagnetic actuating means (26, 30), and an actuating signal for permanently releasing the respective of the first and second braking members (14, 16) is supplied to the other one of the first and second electromagnetic actuating means (26, 30).

8 Claims, 2 Drawing Sheets

(56) References Cited

U.S. PATENT DOCUMENTS

Figure 1:
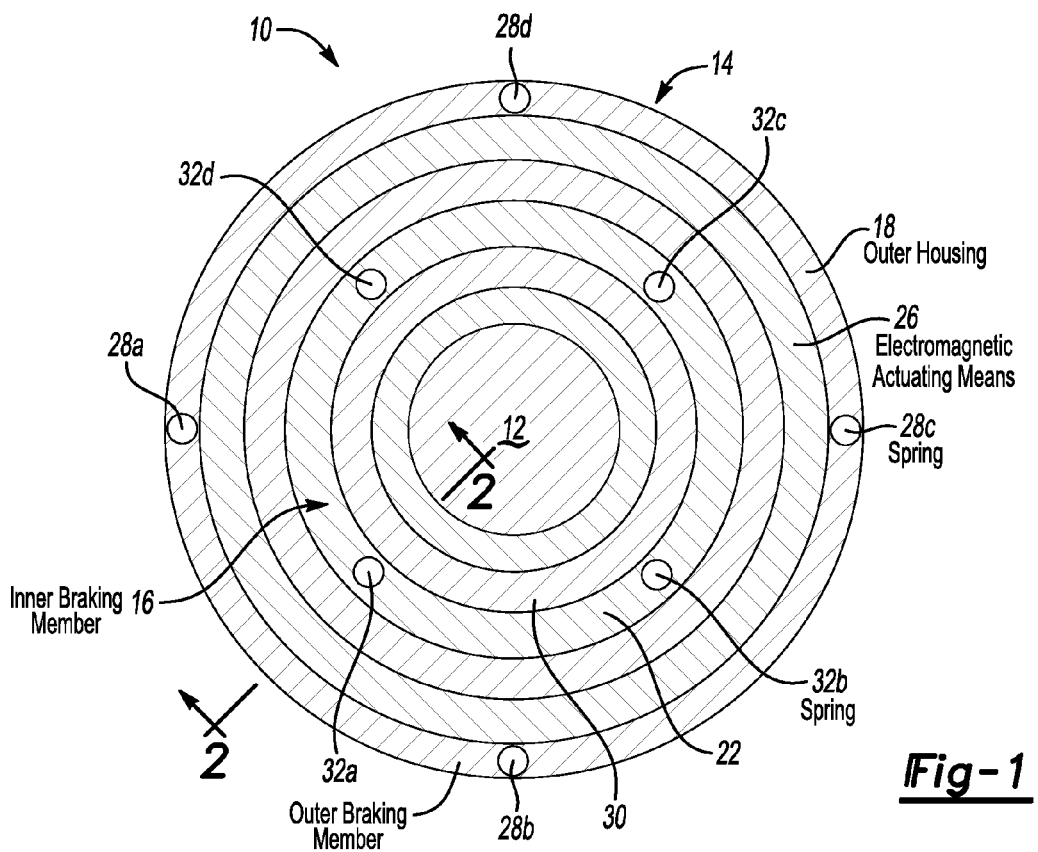

| | | | |
|---|---|---|---|
| 6,196,355 B1 * | 3/2001 | Fargo et al. | 187/393 |
| 7,268,514 B2 * | 9/2007 | DeLange et al. | 318/757 |
| 7,527,127 B2 * | 5/2009 | Osterman et al. | 187/391 |
| 7,730,998 B2 * | 6/2010 | Takahashi et al. | 187/288 |
| 7,896,135 B2 * | 3/2011 | Kattainen et al. | 187/248 |
| 7,896,136 B2 * | 3/2011 | Shibata et al. | 187/288 |
| 7,918,320 B2 * | 4/2011 | Kondo et al. | 187/288 |
| 7,931,127 B2 * | 4/2011 | Kondo et al. | 187/288 |
| 7,938,231 B2 * | 5/2011 | Ueda et al. | 187/288 |
| 8,205,721 B2 * | 6/2012 | Korhonen et al. | 187/288 |
| 2010/0170751 A1 * | 7/2010 | Hashimoto et al. | 187/288 |
| 2010/0252368 A1 * | 10/2010 | Fischer | 187/247 |
| 2012/0073909 A1 * | 3/2012 | Kondo et al. | 187/247 |

* cited by examiner

SINGLE BRAKESHOE TEST (ELECTRICAL) FOR ELEVATORS

The present invention relates to a control arrangement for an elevator brake, and to an elevator brake.

According to present standards, elevators are required to have a redundant braking system. For example, European Standard EN 81 relating to installation of machineroom-less elevators requires that all the mechanical components of the brake which take part in the application of the braking action on the drum or disk shall be installed in two sets. Each of the braking sets is required to be capable of providing a sufficient braking effort to slow down the car, e.g. traveling downwards at rated speed and with rated load, in case the other one the braking sets does not work.

Therefore, the functionality of the brake sets should be tested not only in cooperative operation of both brake sets, but also for each brake set alone. Such so-called single braking member testing requires to keep, temporarily for the course of the test, the braking member of one of the brake sets permanently released, while controlling the braking member of the other brake set according to normal operation.

Presently, retaining one of the braking members permanently in released state is done mechanically. A mechanical means is attached to the braking member to be retained in released state. This is comparatively easy for an elevator having a machineroom, where there is good access to the brake. However, in machineroom-less elevators the machine unit is installed in the elevator shaft, typically at the top or bottom of the elevator shaft, and hence access to the elevator brake to apply such mechanical means for releasing the braking member is often difficult, e.g. requiring a service person to climb on the roof of the car and bring the car in a position where the elevator brake can be accessed. Due to these circumstances, the single braking member test becomes cumbersome.

There were made proposals to provide some kind of mechanical linkage (e.g. Bowden-cables) between the machine unit with the brake sets and an accessible position for manual activation of a permanently releasing of a braking member.

These proposal aimed being able to move the elevator car to a safe position in case of an emergency, e.g. when the elevator car got stuck in the elevator shaft, see e.g. U.S. Pat. Nos. 6,021,872, 6,520,299, 6,817,453. However, such mechanical linkages have a number of disadvantages, particularly because there are constrains on the placing of the mechanical linkage, e.g. maximum distance and/or bending radii to be respected because of friction and/or limited wear resistance of mechanical linkages like Bowden cables.

U.S. Pat. No. 5,199,532 provides a proposal to provide an auxiliary coil for being able to release the braking member of an elevator brake, in case the primary releasing means such as a coil does not release when desired.

Therefore it would be beneficial to a have more convenient possibility for bringing the elevator system into a configuration for carrying out a single braking member test, particularly to be able to permanently release the braking member of one of the brake sets of the elevator brake without the need to have direct access to the elevator brake.

To solve the above problem, the invention proposes a control arrangement for an elevator brake, comprising a control circuit adapted to generate, according to a demand for releasing a first braking member of said elevator brake, a first actuating signal and to generate, according to a demand for releasing a second braking member of said elevator brake, a second actuating signal; a first terminal for outputting said first actuating signal to a first electromagnetic actuating means of said elevator brake; a second terminal for outputting said second actuating signal to a second electromagnetic actuating means of said elevator brake; said control arrangement being adapted to allow at least the following modes of operation: A) a normal operation mode in which said first and said second actuating signals are supplied synchronously to said first and second electromagnetic actuation means, respectively; and B) a single braking member test operation mode, in which one of said first and second actuating signals is supplied to the respective one of said first and second electromagnetic actuating means, and an actuating signal for permanently releasing the respective of said first and second braking members is supplied to the other one of said first and second electromagnetic actuating means.

The invention further provides an elevator brake, comprising a first braking member, said first braking member being biased by a first spring means into engagement with a braking surface, said first braking member comprising a first armature being arranged such as to be actuated by an electromagnetic actuating means, to disengage said first braking member from said braking surface against the biasing force from said first spring means; and a second braking member, said second braking member being biased by a second spring means into engagement with a braking surface, said second braking member comprising a second armature being arranged such as to be actuated by an electromagnetic actuating means, to disengage said second braking member from said braking surface against the biasing force from said second spring means; wherein said elevator brake comprises a first electromagnetic actuating means adapted to actuate said first armature, and a second electromagnetic actuating means adapted to actuate said second armature.

Further the invention provides a brake system for an elevator comprising an elevator control arrangement as outlined and further comprising an elevator brake as outlined.

Figure 2:
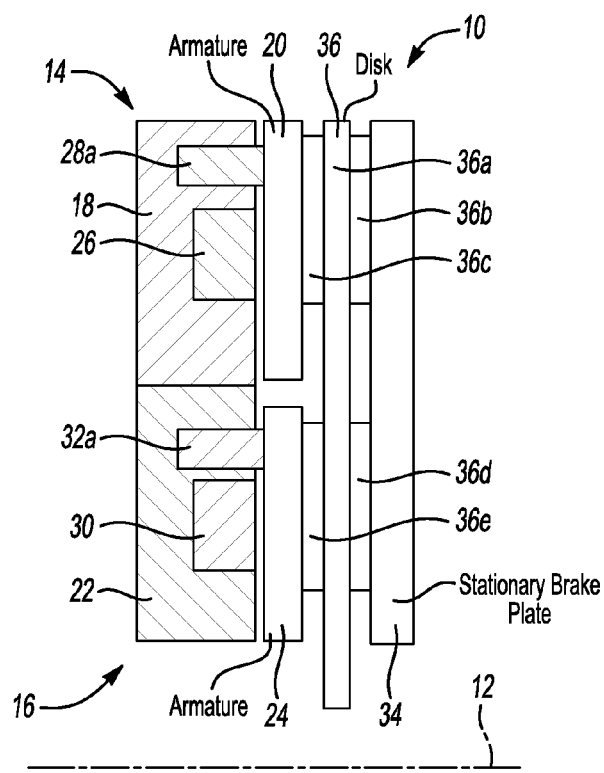
Figure 3:
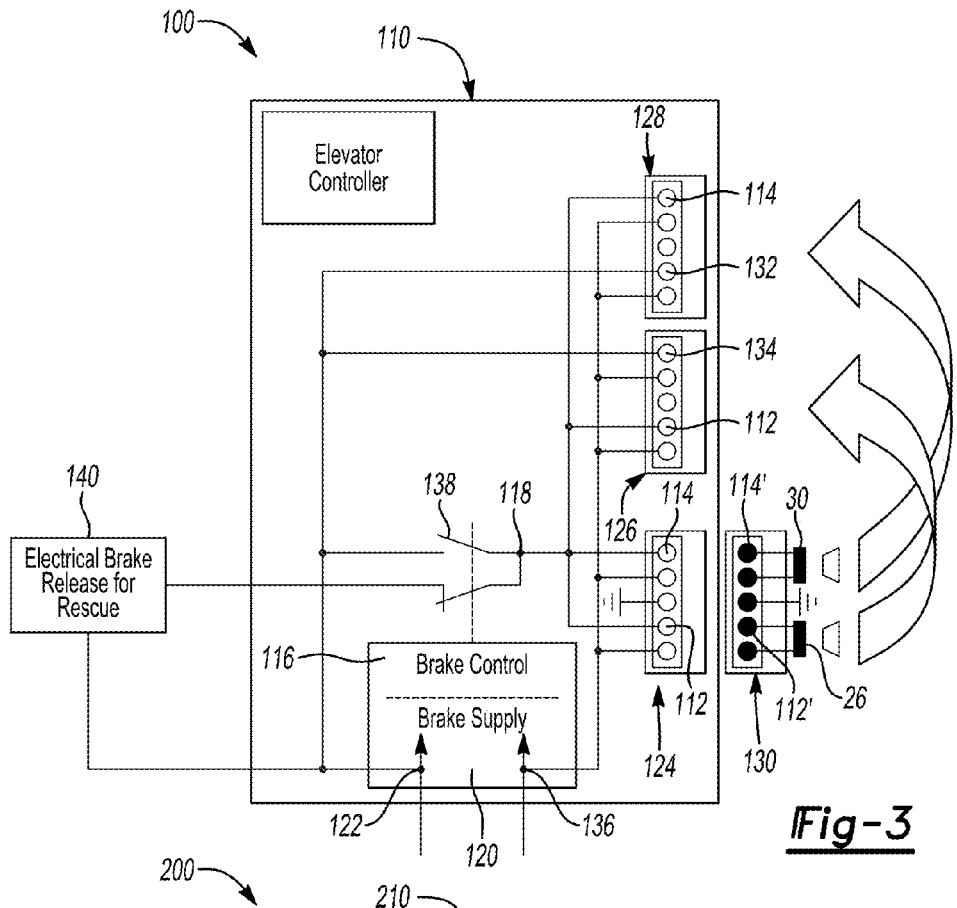
Figure 4:
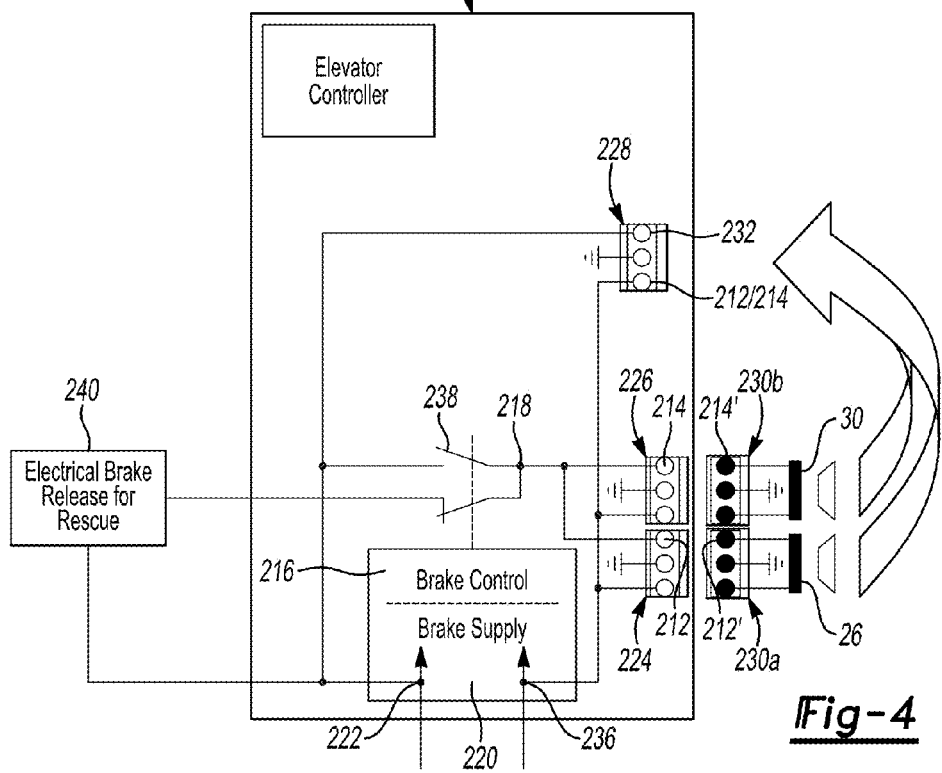

The invention will be described in more detail in the following taking reference to exemplary embodiments, as outlined in the figures. These show:

FIG. 1: a schematic view of an elevator brake according to an embodiment in a view along the axis of the elevator brake;

FIG. 2: the elevator brake of FIG. 1 in cross section as outlined in FIG. 1 by II-II;

FIG. 3: a block diagram of a control arrangement for an elevator brake according to an embodiment; and FIG. 4 a block diagram of a control arrangement for an elevator brake according to a further embodiment.

FIGS. 1 and 2 show, generally depicted by 10, an elevator brake according to an embodiment. FIG. 1 shows the brake 10 in a view along its axis 12, FIG. 2 shows a cross section orthogonal to the axis 12 along line II-II, as indicated in FIG. 1.

The elevator brake 10, which in the view along its axis 12 has a circular cross section, comprises a first or outer braking member 14 and a second or inner braking member 16.

The first braking member 14 comprises a first or outer housing 18 and a first or outer movable brake plate or armature 20. A first electromagnetic actuating means 26 in the form of a first coil, and first spring means 28a, 28b, 28c, 28d, each in the form of a respective coil spring, are provided such as to bias the first braking member 14 by the first spring means 28a, 28b, 28c, 28d into engagement with a braking surface formed by a stationary brake plate 34, and brake linings 36. The brake linings are formed by a disk 36a, and brake linings 36b, 36c, 36d, 36e glued to both planar sides of the disk 36a. The brake linings form a set of first or outer brake linings 36b, 36c assigned to the first braking member 14, and a set of inner or second brake linings 36d, 36e assigned to the second braking member 16.

The first armature 20 is arranged such as to be actuated by the first electromagnetic actuating means 26, to disengage the first braking member 14 from the braking surface against the biasing force applied by the first spring means 28a, 28b, 28c, 28d.

The second braking member 16 comprises a second or inner housing 22 and a second or inner movable brake plate or armature 24. A second electromagnetic actuating means 30 in the form of a second coil, and second spring means 32a, 32b, 32c, 32d, each in the form of a respective coil spring, are provided such as to bias the second braking member 16 by the second spring means 32a, 32b, 32c, 32d into engagement with the braking surface formed by the stationary brake plate 34 and the brake linings 36.

The second armature 24 is arranged such as to be actuated by the second electromagnetic actuating means 30 to disengage the second braking member 16 from the braking surface against the biasing force applied by the second spring means 32a, 32b, 32c, 32d.

From FIG. 2 it can be seen that the first braking member 14 including housing 18 and armature 20, and the second braking member including housing 22 and armature 24, have essentially the same extension in direction of their common axis 12.

When viewed in direction of their common axis 12, as depicted in FIG. 1, the first housing 18 and the second housing 22 each have circular outer peripheries and circular inner peripheries. Thus both, the first housing 18 and the second housing 22 have an annular shape. The first housing 18 and the second housing 22 are arranged coaxially to each other with the circular outer periphery of the second housing 22 being coincident with the circular inner periphery of the first housing 18. Both, the first housing 18 and the second housing 22 form an integrated rigid body, either being formed as a single workpiece or being joined together integrally. The advantage of providing the first and second housings in and integrated body is that holding the brake is simplified, as only the outer housing needs to be supported, particularly such as to be fixed against rotation.

Also the first armature 20 and the second armature 24 have circular outer peripheries and circular inner peripheries. Both, the first armature 20 and the second armature 24 have an annular shape. The first armature 20 and the second armature 24 are arranged coaxially to each other with respect to their common axis 12.

Inside the inner periphery of second housing 22 and second armature 22 there remains a disk shaped free space. This space may accommodate an output shaft of a drive motor (not shown), the output shaft extending along axis 12. In this way the elevator brake 10 can be arranged surrounding the output shaft of the drive motor, and thus needs only little space.

Disk 36a supporting disk linings 36b, 36c, 36d and 36e is supported at the output shaft of the drive motor, such as to rotate together with the output shaft. The other components, particularly stationary plate 34 and the first and second brake members 14 and 16 are supported such as to be stationary with respect to the output shaft of the drive motor.

The annular first housing 18 and annular second housing 22 each have a cross section, seen in direction orthogonal to their common axis 12, as depicted in FIG. 2, being essentially rectangular, and thus the first housing 18 and the second housing 22 each have a shape of a flat torus or short hollow cylinder. Likewise, the annular first armature 20 and annular second armature 24 each have a cross section, seen in direction orthogonal to their common axis 12, as depicted in FIG. 2, being essentially rectangular, and thus the first armature 20 and the second armature 24 each have a shape of a flat torus or short hollow cylinder.

The first electromagnetic actuating means 26 is received in an annular groove formed within the first housing 18. Similarly the second electromagnetic actuating means 30 is received in an annular groove formed within the second housing 22. The grooves for accommodating the first or second electromagnetic actuating means 26, 30 each surround the common axis 12 of the housings, and thus are arranged coaxially with respect to the first and second housings 18, 22, respectively. The cross section of the grooves in a direction orthogonal to the common axis 12 is essentially rectangular, corresponding to the first and second electromagnetic actuating means 26, 30. Seen in a radial direction, the grooves are located centrally with respect to the first and second housings 18, 22, respectively.

The first spring means comprises a plurality of first coil springs 28a, 28b, 28c, 28d, arranged along the periphery of a circle around axis 12 in equal angular distances of in this example 90 degrees to each other. Correspondingly, the second spring means comprises a plurality of second coil springs 32a, 32b, 32c, 32d arranged along the periphery of a circle around axis 12 in equal angular distances of in this example 90 degrees to each other. As can be seen from FIG. 2, the second coil springs 32a, 32b, 32c, 32d of the second spring means are arranged in staggered relation to the first coil springs 28a, 28b, 28c, 28d of the first spring means. The offset is 45 degrees, and therefore each of the second coil springs 32a, 32b, 32c, 32d is arranged at an angular position halfway between two consecutive of the first coil springs (see e.g. 32d being located midway between 28d and 28a).

FIGS. 3 and 4 show two embodiments of a control arrangement for an elevator brake as disclosed in FIGS. 1 and 2 in form of simplified block diagrams. The control arrangement will be explained in the following taking reference to the embodiment of FIG. 3. FIG. 4 will only be explained insofar as the embodiment disclosed therein differs from the embodiment of FIG. 3.

The control arrangement for an elevator brake 10, in FIG. 3 generally designated by 100, comprises a control circuit 110 adapted to generate, according to a demand for releasing the first braking member (e.g. a braking member as designated by 14 in FIG. 1) of the elevator brake, a first actuating signal and to generate, according to a demand for releasing the second braking member 16 (e.g. a braking member as designated by 14 in FIG. 1) of the elevator brake 10, a second actuating signal. The control circuit has a first terminal 112 for outputting the first actuating signal to the first electromagnetic actuating means 26 of the elevator brake 10. For receiving this first actuating signal the electromagnetic actuating means 26 has a first terminal 112'. The control circuit 110 further has a second terminal 114 for outputting the second actuating signal to the second electromagnetis actuating means 30 of the elevator brake 10. For receiving this second actuating signal the electromagnetic actuating means 30 has a second terminal 114'.

Control circuit 110 includes a brake control unit 116 for controlling, according to a demand of releasing said first and second braking members 14, 16 in a normal operation mode, output of the first and second actuating signal from the control circuit 110 at the first and second terminals 112 and 114. Brake control unit 116 has a brake control output 118, in this example realized as the output of a brake control relay 138. Brake control output 118 is connected in parallel to the first and second terminals 112, 114 to provide the first and second actuating signals. Brake control unit 116 includes a brake supply unit 120 for providing a power signal of a level to be applied to the actuating means 26, 30 of the elevator brake 10 to release the respective braking members 14, 16. The power signal is output permanently from brake supply unit at output 122. Brake supply unit has a further output 136 providing a ground signal for the control signals output at the first and second terminals 112 and 114.

Brake control relay 138 is controlled by brake control unit 116 such as to connect, in case the first and the second actuating signal is to be provided at the first and second terminals 112 and 114, brake control output 118 to output 122 of the brake supply 120. Output 118 thus is controlled by brake control unit 116 such as to provide the power signal only in case the brake control unit 116 determines a demand for releasing the first and second braking members 14, 16 of the elevator brake in the normal operation mode. Otherwise, unless electrical brake release for rescue control 140 is activated (see below) no power signal is supplied from output 118, and therefore no actuation signal is provided by the first and second terminals 112, 114.

Control arrangement 100 allows switching between the normal operation mode, in which the first and second braking members 14, 16 are operated synchronously, and two further single braking member test operation modes, namely a first braking member test operation mode and a second braking member test operation mode. In the first braking member test operation mode, the elevator is to be braked by the first braking member 14 alone, with the second braking member 16 being retained in a permanently released position. Vice versa, in the second braking member test operation mode, the elevator is to be braked by the second braking 16 member alone, with the first braking member 14 being retained in a permanently released position.

To allow switching between the above mentioned different operation modes, control circuit 110 includes three different connectors, in this case sockets, 124, 126 and 128 for supplying the first and the second actuating signals respectively. These sockets 124, 126, 128 all have an identical layout of five terminals, and fit to the layout of a single connector, in this case a plug, 130 provided on the side of the elevator brake. Each of the connectors 124, 126, 128 on the side of the control circuit 110 comprises, at a same position, a first terminal 112 or a second terminal 114 and corresponding ground terminals. The first terminals 112 and the second terminals 114 on each of the connectors are connected in parallel with the brake control output 118.

In the normal operation mode, connector 130 on the side of the brake is connected to connector 124 on the side of control circuit 110, as is shown. For switching to the first braking member test operation mode, connector 130 on the side of the brake is disconnected from connector 124 (or 128) and connected to connector 126 on the side of control circuit 110 (as is indicated by a curved arrow in the figure). For switching to the second braking member test operation mode, connector 130 on the side of the brake is disconnected from connector 124 (or 126) and is connected to connector 128 on the side of control circuit 110 (as is indicated by another curved arrow in the figure).

In addition, connector 126 comprises a third terminal 134 connected directly to output 122 of the brake supply 120, and connector 128 also comprises a third terminal 132 connected directly to output 122 of the brake supply 120. In a situation in which terminal 130 on the brake side is connected to connector 126 on the side of control circuit 110, the third terminal 134 will connect to terminal 114', and thus deliver to the second actuating means 30 a signal for permanently releasing the second brake member 16. Vice versa, in a situation in which terminal 130 on the brake side is connected to connector 128 on the side of control circuit 110, the third terminal 132 will connect to terminal 112' and deliver to the first actuating means 30 a signal for permanently releasing the first brake member 14. Therefore, in case connector 130 is connected to connector 126, the second braking member will be released permanently (=first braking member test operation mode). Vice versa, in case connector 130 is connected to connector 128, the first braking member will be released permanently (=second braking member test operation mode).

Control arrangement 100 further provides an electrical brake release for rescue control 140 allowing to release the elevator brake in case of an emergency, e.g. in case the elevator car is stuck in the elevator shaft, and there is no possibility of releasing the elevator brake by normal operation. The elevator brake release for rescue control 140 provides a power signal to terminals 112 and 114, in case electric brake release for rescue is activated (this is usually done manually by a person operating a respective operating device, e.g. in the machineroom, or outside the elevator shaft), and the brake control relay 138 is in its state disconnecting brake control output 118 from power supply output 122 (e.g. in case of power loss, as brake control relay 116 will usually be of a normally-open type). As indicated in FIG. 3, brake control relay 142, when switched into a state disconnecting brake control output 118 from power supply output 122, will at the same time connect electric brake release for rescue control 140 with output 118, and hence actuation signals for releasing the first and/or second brake members 14, 16 will be applied to terminals 112, 114, in case electric brake release for rescue control 140 is activated.

The control arrangement 200 shown in FIG. 4 basically corresponds to the control arrangement of FIG. 3. For that reason, in FIG. 4 same components as are disclosed in FIG. 3 are designated by same reference signs as in FIG. 3 with 100 added thereto. The following description will only refer to differences between the embodiments of FIG. 3 and FIG. 4. For all other details, it is referred to the description of FIG. 3.

In the embodiment of FIG. 3, two connectors 230a and 230b are provided on the side of the brake. Connector 230a connects to the first electromagnetic actuating means 26 for releasing the first braking member 14, while connector 320b connects to the second electromagnetic actuating means 30 for releasing the second braking member 14. On the side of the control circuit 210, three connectors 224, 226 and 228 are provided. In normal operation mode, connector 224 connects to connector 230a on the side of the brake, and connector 226 connects to connector 230b on the side of the brake. Thus in normal operation mode, connector 224 on the side of control circuit 210 provides the first actuating signal to the first electromagnetic actuating means 26, and connector 226 on the side of control circuit 210 provides the second actuating signal to the second electromagnetic actuating means 26.

To switch to the first braking member test operation mode, the connector 230b for the second actuating means 30 is disconnected from connector 226 and connected to connector 228 (as is indicated by a curved arrow in the figure). Now the sec- and actuating means 30 receives via the third terminal 232 and terminal 214' an actuating signal for permanently releasing the second braking member 16. Vice versa, to switch to the second braking member test operation mode, the connector 230a for the first actuating means 26 is disconnected from connector 224 and connected to connector 228 (as is indicated by another curved arrow in the figure). Now the first actuating means 26 receives via the third terminal 232 and terminal 212 an actuating signal for permanently releasing the first braking member 14.

The embodiments described herein, on the one hand, provide a convenient possibility for bringing the elevator system from a normal configuration into a configuration for carrying out a single braking member test. No cumbersome access to the elevator machine or elevator brake is necessary. The control can be provided at any suitable location, either in a machine room, if desired, or in the elevator shaft, e.g. close to a maintenance floor, or even besides the elevator shaft, e.g. in a maintenance cabinet or the like. On the other hand, switching between the different operation modes, particularly switching to one of the single braking member test operation modes, requires unplugging and replugging of connector which creates enough efforts that undue switching to such modes, e.g. by unauthorized persons or by inadvertence should be unlikely.

In an embodiment the present invention suggests a control arrangement for an elevator brake, comprising a control circuit adapted to generate, according to a demand for releasing a first braking member of said elevator brake, a first actuating signal and to generate, according to a demand for releasing a second braking member of said elevator brake, a second actuating signal, a first terminal for outputting said first actuating signal to a first electromagnetic actuating means (in the following also: first actuating means) of said elevator brake, a second terminal for outputting said second actuating signal to a second electromagnetic actuating means (in the following also: first actuating means) of said elevator brake, said control arrangement being adapted to allow at least the following modes of operation: A) a normal operation mode in which said first and said second actuating signals are supplied synchronously to said first and second electromagnetic actuation means, respectively, and a single braking member test operation mode, in which one of said first and second actuating signals is supplied to the respective one of said first and second electromagnetic actuating means, and an actuating signal for permanently releasing the respective of said first and second braking members is supplied to the other one of said first and second electromagnetic actuating means.

The invention basically proposes to control two braking members (in praxis these will commonly have the form of brake shoes) by two, separate electrical activators (e.g. electromagnets or coils). In normal operation these activators are controlled in parallel. When switched to single brake member test operation mode, the control lines will be separated to allow to control just one of the brake members in a manner according to the normal control, and to control the other braking member such as to be open for the respective test.

This requires no mechanical manipulation on the brake hardware, but just provision of an electrical connection, or a number of respective electrical connections. Thus it is easy and inexpensive to install and to operate. There is almost no wear even during extended use, and hence there are only small maintenance requirements.

These embodiments allow to electrically switch to single braking member test operation modes. Therefore the control arrangement can be placed remotely from the elevator brake, e.g. on a control panel installed at any suitable location inside or outside the elevator shaft (e.g. in a maintenance cabinet outside the elevator shaft), and switching can be done from a remote location.

Since this approach gives wide flexibility for a location from which the single braking member tests can be activated and run, it further facilitates concentration of several maintenance tasks at a common location.

In an embodiment said single braking member test operation mode comprises the following operation modes: B1) a first braking member test operation mode in which the second electromagnetic actuating means is supplied with the actuating signal for permanently releasing the second braking member, and B2) a second braking member test operation mode in which the first electromagnetic actuating means is supplied with the actuating signal for permanently releasing the first braking member.

The actuating signal for permanently releasing the first and/or second braking members may be supplied to a third terminal of the control arrangement. The third terminal may be connected to a specific terminal of the first and/or second actuation means. Switching means may be provided by which the third terminal is connected to the first or second actuating means instead of or additionally to the first and second terminals, respectively. Further, the third terminal may be arranged such as to override any "normal" signal applied to the first and/or second actuating means via the first and/or second terminal, respectively.

In elevators comprising an electrical brake release for rescue control, upon activation of that control by an operator (e.g. in case the elevator car is stuck between two landings, because one of the elevator brakes remains in engaged position), a rescue release signal for releasing the first and/or the second braking elements is supplied to the first and second actuating means of the elevator brake, in order to allow the car to be moved to the next safe position. Such rescue release signal basically is a signal for permanently releasing the elevator brake, to allow at least slow motion of the car.

The control circuit may comprise a brake control unit for controlling, according to a demand of releasing the first and second braking members in the normal operation mode, output of an actuating signal from the control circuit at a brake control output, the brake control output being connected in parallel to the first and second terminals to provide the first and second actuating signals. This provides a simple way to achieve synchrony of the first and second actuating signals.

The actuating signal provided at the brake control output may be an on/off signal having only two levels according to fully engaging (e.g. signal level of zero) or fully releasing of the first and/or the second braking members. In this case, speed control may be realized by controlling released/engaged states of the braking members according to predetermined speed levels (two level control). Alternatively, it is conceivable to allow the braking members to be released only for a predetermined time which is set such that the elevator car will never exceed a predetermined speed. If desired, the actuating signal may be a signal having levels between a level corresponding to fully engaging the braking members (e.g. a signal level of zero) and fully releasing the braking members.

The control circuit may further comprise a brake supply unit providing a power signal according to a power to be applied to the first and/or second electromagnetic actuating means for releasing the first and/or the second braking members. In an embodiment the power signal provided by the brake supply unit may correspond to a power necessary for actuating the electromagnetic actuating means, e.g. an armature, of the elevator brake, e.g. a spring biased electromagnetic brake, such as to fully release the brake.

In an embodiment the control arrangement may further comprise means for providing the power signal to the brake control output, in case the control circuit determines that the first and/or second braking members are to be released. Such means may be realized by a brake control relay, connected, on the input side, to a power supply output of the brake supply means, and connected, on the output side, to the control output. On the control side, such relay may receive a switching signal from the brake control unit. Such relay, as an electromechanical device, provides a sufficiently robust switching means to withstand harder environments, and thus is an efficient solution. Alternatively, also pure electrical switching means like suitable semiconductor circuits are conceivable.

Further, the control arrangement may comprise means for providing the power signal permanently to the third terminal. Switching to a single brake member test operation mode can thus be effected by establishing an electrical connection of the respective first or second actuating means to the third terminal.

Via the brake control output the control circuit may control operation of the elevator brake according to the "normal" operation mode. For control of the elevator brake in other operation modes, the control circuit may provide a power supply output to which permanently is supplied a signal for releasing the elevator brake. Such further output may be used exclusively for supplying the permanent actuating signal in the single braking member test operation mode to either one of the first and second terminals. In case an electrical brake release for rescue control is provided, the power signal from the further output, which is permanently available, may be used by the electrical brake release for rescue control. It is conceivable that the single braking member test operation mode may use the same power signal provided from the further output as is used by the brake release for rescue control unit. Thus, no additional power signal is necessary for the electrically operable single braking member test operation mode.

Switching means for allowing to switch from the normal operation mode to a single braking member test operation mode can be provided in a number of different ways, e.g. by providing respective electrical or electro-mechanical switching devices for the control arrangement, or even by software in case the control arrangement involves a microprocessor.

In an embodiment of the invention such switching means are provided by a connector arrangement for connecting the control arrangement to the electromagnetic actuating means of the elevator brake. In such connector arrangement, for each of the operation modes there is predefined a specific scheme for connecting first connectors on the controller side to second connectors on the brake side, and to switch from one operation mode to another, these connections of first connectors to second connectors are changed accordingly to another scheme. This may be done manually by unplugging these connectors and replugging them in a desired scheme. While, on the one hand, such procedure seems to be intricate and cumbersome, it has the advantage of efficiently avoiding any unwanted or erroneous switching from the normal operation mode into one of the other operation modes. Particularly, switching into the single braking member test operation modes should be effected only by trained service personnel and with care, since it will result in the elevator system being braked only by a single braking member.

In further embodiment, the control arrangement may comprise a connector arrangement for connecting the control arrangement to the electromagnetic actuating means of the elevator brake, the connector arrangement, on the controller side, comprising a plurality of first connectors, each of the first connectors having a plurality of terminals including the first terminal and/or the second terminal, each of the first connectors having the terminals arranged in a same layout, and at least one of the first connectors comprising the third terminal, and the connector arrangement, on the brake side, comprising at least one second connector having terminals arranged in a layout complementary to the layout of the first connectors.

To be complementary to the first connectors, the at least one second connector may comprise a terminal corresponding to the first terminal and/or a terminal corresponding to the second terminal, and at least one terminal corresponding to the third terminal, these terminals being arranged in a layout corresponding the layout of the first connectors.

In an embodiment the first and/or second terminals are connected, on the controller side, to the brake control output of the control circuit, and the at least one third terminal is connected, on the controller side, to the further output of the control circuit.

In an embodiment, the terminals corresponding to the first and second terminals are connected, on the brake side, to the first and second actuating means, respectively. The terminal corresponding to the at least one third terminal is connected, on the brake side, to the first and/or second actuating means in a manner as to replace or override any first and/or second actuating signal being supplied from the respective first and/or second terminals on the controller sides.

In the normal operation mode the at least one second connector will be connected to a first connector having corresponding ones of the first and second terminals, but not having a third terminal thereon or having a third terminal thereon being connected to the further output of the control circuit via a switch means adapted to disconnect the third terminal from the further output in the normal operation modes.

To switch to one of the single braking member test operating modes, the second connector having a terminal for that electromagnetic actuating means assigned to the brake element to be released for the test is switched to another one of the first connectors having a third terminal thereon at a corresponding position. E.g. this may be done by plugging off the second connector from the first connector it is connected with in the normal operation mode, and plugging on the second connector to another one of the first connectors having the third terminal connected to the further output.

An advantage of such procedure is that it is not too easy to switch from the normal operation mode to the single braking member test operation modes, and therefore erroneous or unauthorized switching to single braking member test operation modes can be avoided. This is particularly important as, once having been switched to the single braking member test operation modes, the elevator system will be braked only by a single braking member. Further, at least for authorized persons, the positions of the first and second connectors can be seen very easily, e.g. by just looking at a control panel, and thus it can be controlled straightforwardly whether the elevator system is in the normal operation mode or any other operation mode.

The control arrangement, as outlined above, may comprise, on the controller side, a respective first connector for each of the normal operation mode, the first braking member test operation mode, and the second braking member test operation mode, and may comprise, on the brake side, one second connector for commonly connecting to the first and second actuating means, the second connector being adapted to be connected, according to a desired mode of operation, to a respective one of the first connectors.

In an embodiment the first connectors, and consequently also the second connector, each may comprise five terminals, with a layout as follows: The second connector may comprise one terminal assigned to the first terminal, and thus connected to the first second actuating means, this terminal being provided for receiving the actuating signal for the first actuating means, and one terminal assigned to the second terminal, and thus connected to the second actuating means, this terminal being provided for receiving the actuating signal for the secand actuating means. There may be one further terminal connected to earth, and two other terminals, connected to a ground being reference to all actuating signals.

One of the first connectors assigned to the normal operation mode may comprise one first terminal for transmitting the actuating signal for the first actuating means (and thus connected to the brake control output), one second terminal for trans-mitting the actuating signal for the second actuating means (and thus also connected to the brake control output), one terminal connected to earth, and two further terminals connected to ground.

There may be provided a further first connector for connecting to the actuating means in case the first braking member test operation mode is to be carried out. The terminals of this first connector are identical to the first connector described above for normal operation, except for the second terminal which is replaced by a third terminal that is directly, i.e., without any switching means being connected in between, connected to the further output of the control circuit for providing a permanent actuating signal to the second actuating means. When the second connector is connected to that first connector the second actuating means will receive permanently a signal for releasing the second braking member, and thus the elevator brake will only work using the first braking member. In this way, the function of the first braking member can be tested (first braking member test operation mode).

Similarly, for performing a second braking member test operation mode another first connector is provided. The terminals of this connector are identical to the first connector described above for normal operation, except for the first terminal which is replaced by a third terminal that is directly, i.e. without any switching means being connected in between, connected to the further output of the control circuit, for providing a permanent actuating signal to the first actuating means.

Alternatively, the control arrangement may comprise, on the controller side, respective first connectors for connecting, in the normal operation mode, to each of the first actuating means and the second actuating means, and a further first connector for single braking member test operation, and may further comprise, on the brake side, respective second connectors for connecting each of the first actuating means and the second actuating means to the control arrangement, each of the second connectors being adapted to be connected, according to a desired mode of operation, either to the corresponding one of the first connectors for normal operation mode, or to the further first connector.

The further first connector for single braking member test operation may be adapted for connecting, in the first braking member test operation mode, to the second actuating means, or for connecting, in the second braking member test operation mode, to the first actuating means.

In this embodiment, according to a desired mode of operation the second connectors will be connected to the first connectors as follows: For normal operation mode the second connectors will be connected to the corresponding first connectors for normal operation. For switching to the first braking element test operation mode, the second connector for the second actuating means is disconnected from the corresponding first connector for normal operation and connected to the further first connector for single braking member test operation. This has the effect that the second actuating means will be supplied with a permanent actuating signal, and therefore the second braking means will be released permanently. Similarly, for switching to the second braking member test operation mode, the second connector for the first actuating means is disconnected from the corresponding first connector for normal operation and connected to the further first connector for single braking member test operation.

Connectors as defined above, can be all kinds of connecting mechanisms that are connectable/disconnectable multiple times without requiring excessive efforts. In an embodiment female connectors like sockets can be used on the one side (e.g. on the controller side), and corresponding male connectors like plugs can be used on the other side (in this example on the brake side).

It is not necessarily required that all connectors, as defined above, are different devices being physically movable to each other. Rather it will be sufficient for the intentions of these embodiments, if the connectors on the one side (e.g. the connector on the side of the brake) are separated devices movable to each other, while the connectors on the other side are fixed relative to each other or even realized as a single physical device (e.g. as a single large socket on a circuit board).

In a further embodiment, the control arrangement may further comprise monitoring means for monitoring releasing and engaging of the first and second brake elements, respectively, wherein the control arrangement may be adapted to suspend the monitoring means in response to a request to enter one of the single braking member test operation modes, and wherein the control arrangement may allow, in response to a request to enter one of the single braking member test operation modes, a predetermined number of runs of an elevator car to be braked by the elevator brake.

This can avoid that the elevator is operated continuously in one of the single braking member test operation modes (in which only one of the elevator brakes in in operation an the other one is released), e.g. due to a service person forgetting to restore the normal mode of operation after carrying out a single braking member test, the control arrangement may provide measures to only allow a temporarily operation of the elevator in any of the single brake element test operation modes.

In a further embodiment an elevator brake is suggested, comprising a first braking member, the first braking member being biased by a first spring means into engagement with a braking surface, the first braking member comprising a first armature being arranged such as to be actuated by an electromagnetic actuating means, to disengage the first braking member from the braking surface against the biasing force from the first spring means, and a second braking member, the second braking member being biased by a second spring means into engagement with a braking surface, the second braking member comprising a second armature being arranged such as to be actuated by an electromagnetic actuating means, to disengage the second braking member from the braking surface against the biasing force from the second spring means, wherein the elevator brake comprises a first electromagnetic actuating means adapted to actuate the first armature, and a second electromagnetic actuating means adapted to actuate the second armature.

In particular embodiments, each of the first and second electromagnetic actuating means includes a respective electromagnetic coil.

The first braking member may comprises a first housing and the second braking member may comprises a second housing.

Each of the first and second armatures, as well as each of the first and second housings, may have a shape defining an axis, and the first and the second armatures, as well as each of the first and second housings, may be arranged coaxially to each other. The arrangement of the first and second armatures, as well as each of the first and second housings, thus will be such that the first and second armatures, as well as each of the first and second housings, define coincident axes.

Particularly both armatures and both housings may have essentially the same extension in direction of their common axis.

In an embodiment one of the armatures, called the inner armature, may be located closer to the common axis than the other armature, called the outer armature, such that the inner armature is enclosed by the outer armature. Likewise, one of the housings, called the inner housing, may be located closer to the common axis than the other housing, called the outer housing, such that the inner housing is enclosed by the outer housing.

In particular embodiments the common axis of the first and second armatures may be an axis of rotational symmetry with respect the first and/or the second armatures. Likewise, the common axis of the first and second housings may be an axis of rotational symmetry with respect the first and/or the second housings.

In a further embodiment, in a view in direction of their common axis, each of the first and the second armatures may have a circular outer periphery and/or have a circular inner periphery. Likewise, each of the first and the second housings may have a circular outer periphery and/or have a circular inner periphery.

The first and second armatures and/or the first and second housings each may have an annular shape.

The cross section of the annular bodies forming the first and second armature and or the first and second housings, respectively, in direction orthogonal to their common axis, may be circular (the annular bodies thus having toroidal shape), or essentially rectangular (the annular bodies thus having shapes similar to a flat torus or short hollow cylinder, respectively).

The annular first and the second housings may be arranged coaxially to each other in such a way that each of the first and second housings, when assembled together, fills a portion of a circular disk. One of the housings may form an outer annulus or outer disk portion enclosing the other housing forming inner disk portion. Particularly, the outer disk portion having the shape of an annulus may have an inner periphery identical to the outer periphery of the inner disk portion, such that in an assembled state the first and second housings form a contiguous disk portion. Particularly, the inner disk portion may be cut out in its central portion, such as to form an inner annulus. In an assembled state the first and second housings thus have the shape of an annulus the inner periphery of which is formed by the inner periphery of the inner annulus, and the outer periphery of which is formed by the outer periphery of the outer annulus.

The first housing and the second housing may even be formed as an integrated body, either by forming both the first and second housings from a single workpiece or by joining the first and second housings integrally together. Such construction will simplify holding of the brake members, as it is sufficient to support the first housing to a stationary structure.

Further, each of the first and the second housings may a groove formed therein, the first or second electromagnetic actuating means being received in the groove.

In an embodiment, the grooves for accommodating the first or second electromagnetic actuating means may each surround the common axis of the housings. Particularly, the grooves may have an annular shape and may be arranged also coaxially with respect to the first and second housings, respectively. The cross section of the grooves in a direction orthogonal to the common axis may be circular (toroidal grooves) or may be essentially rectangular (flat toroidal grooves).

The first spring means may comprise a plurality of first springs arranged along the periphery of a circle around the axis in equal angular distances to each other, and the second spring means comprises a plurality of second springs arranged along the periphery of a circle around the axis in equal angular distances to each other, the first springs being accommodated within respective recesses formed in the first housing, and the second springs being accommodated within respective recesses formed in the second housing.

In an embodiment, the angular distances between each two consecutive of the first springs may be equal to the angular distances between each two consecutive of the second springs. Further, the second springs of the second spring means may be arranged in staggered relation to the first springs of the first spring means, such that a respective of the second springs is arranged at an angular position halfway between two consecutive of the first springs.

A further embodiment is a brake system for an elevator comprising an elevator control arrangement as outlined above, and further comprising an elevator brake as outlined above.

While the invention has been described with reference to exemplary embodiments, it will be understood by those skilled in the art that various changes may be made and equivalents may be substituted for elements thereof without departing from the scope of the invention. In addition, many modifications may be made to adapt the particular situation or material to the teachings of the invention withdeparting from the essential scope thereof. Therefore it is intended that the invention not be limited to the particular embodiments disclosed, but that the invention will include all embodiments falling within the scope of the appended claims.

The invention claimed is:

1. A control arrangement for an elevator brake, comprising
a control circuit adapted to generate, according to a demand for releasing a first braking member of said elevator brake, a first actuating signal and to generate, according to a demand for releasing a second braking member of said elevator brake, a second actuating signal;
a first terminal for outputting said first actuating signal to a first electromagnetic actuator of said elevator brake;
a second terminal for outputting said second actuating signal to a second electromagnetic actuator of said elevator brake;
said control arrangement being adapted to allow at least the following modes of operation:
   A) a normal operation mode in which said first and said second actuating signals are supplied synchronously to said first and second electromagnetic actuation means, respectively; and
   B) a single braking member test operation mode, in which one of said first and second actuating signals is supplied to the respective one of said first and second electromagnetic actuating means, and test operation mode actuating signal for releasing the respective of said first and second braking members for a duration of the test operation mode is supplied to the other one of said first and second electromagnetic actuators,
wherein said test operation mode actuating signal is supplied to a third terminal of said control arrangement.

2. A control arrangement for an elevator brake, comprising
a control circuit adapted to generate, according to a demand for releasing a first braking member of said elevator brake, a first actuating signal and to generate, according to a demand for releasing a second braking member of said elevator brake, a second actuating signal:

a first terminal for outputting said first actuating signal to a first electromagnetic actuator of said elevator brake;

a second terminal for outputting said second actuating signal to a second electromagnetic actuator of said elevator brake:

said control arrangement being adapted to allow at least the following modes of operation:
  A) a normal operation mode in which said first and said second actuating signals are supplied synchronously to said first and second electromagnetic actuation means, respectively; and
  B) a single braking member test operation mode, in which one of said first and second actuating signals is supplied to the respective one of said first and second electromagnetic actuating means, and test operation mode actuating signal for releasing the respective of said first and second braking members for a duration of the test operation mode is supplied to the other one of said first and second electromagnetic actuators, wherein said control circuit comprises a brake control unit for controlling, according to a demand of releasing said first and second braking members in said normal operation mode, output of an actuating signal from said control circuit at a brake control output, said brake control output being connected in parallel to said first and second terminals to provide said first and second actuating signals.

3. A control arrangement for an elevator brake, comprising a control circuit adapted to generate, according to a demand for releasing a first braking member of said elevator brake, a first actuating signal and to generate, according to a demand for releasing a second braking member of said elevator brake, a second actuating signal;

a first terminal for outputting said first actuating signal to a first electromagnetic actuator of said elevator brake;

a second terminal for outputting said second actuating signal to a second electromagnetic actuator of said elevator brake;

said control arrangement being adapted to allow at least the following modes of operation:
  A) a normal operation mode in which said first and said second actuating signals are supplied synchronously to said first and second electromagnetic actuation means, respectively; and
  B) a single braking member test operation mode, in which one of said first and second actuating signals is supplied to the respective one of said first and second electromagnetic actuating means, and test operation mode actuating signal for releasing the respective of said first and second braking members for a duration of the test operation mode is supplied to the other one of said first and second electromagnetic actuators, wherein said control circuit comprises a brake supply unit providing a power signal according to a power to be applied to said first and/or second electromagnetic actuators for releasing said first and/or said second braking members.

4. Control arrangement according to claim 3, further comprising means for providing said power signal to said brake control output, in case said control circuit determines that said first and/or second braking members are to be released, and further comprising means for providing said power signal permanently to said third terminal.

5. A control arrangement for an elevator brake, comprising a control circuit adapted to generate, according to a demand for releasing a first braking member of said elevator brake, a first actuating signal and to generate, according to a demand for releasing a second braking member of said elevator brake, a second actuating signal;

a first terminal for outputting said first actuating signal to a first electromagnetic actuator of said elevator brake;

a second terminal for outputting said second actuating signal to a second electromagnetic actuator of said elevator brake;

said control arrangement being adapted to all at least the following modes of operation:
  A) a normal operation mode in which said first and said second actuating signals are supplied synchronously to said first und second electromagnetic actuation means, respectively;
  B) a single braking member test operation mode, in which one of said first and second actuating signals is supplied to the respective one of said first and second electromagnetic actuating means, and test operation mode actuating signal for releasing the respective of said first and second braking members for a duration of the test operation mode is supplied to the other one of said first and second electromagnetic actuators;

a connector arrangement for connecting said control arrangement to said electromagnetic actuators of said elevator brake;

said connector arrangement, on the controller side, comprising a plurality of first connectors; each of said first connectors having a plurality of terminals including said first terminal and/or said second terminal; each of said first connectors having said terminals arranged in a same layout; and at least one of said first connectors comprising said third terminal; and said connector arrangement, on the brake side, comprising at least one second connector having terminals arranged in a layout complementary to the layout of said first connectors.

6. The control arrangement according to claim 5, comprising, on the controller side, a respective first connector for each of the normal operation mode, a first braking member test operation mode, and a second braking member test operation mode; and comprising, on the brake side, one second connector for connecting to said first and second actuators, said second connector being adapted to be connected, according to a desired mode of operation, to a respective one of said first connectors.

7. The control arrangement according to claim 5, comprising, on the controller side, respective first connectors for connecting, in the normal operation mode, to each of said first actuators and said second actuators, and a further first connector for single braking member test operation; and further comprising, on the brake side, respective second connectors for connecting each of said first actuators and said second actuators to said control arrangement;

each of said second connectors being adapted to be connected, according to a desired mode of operation, either to the corresponding one of said first connectors for normal operation mode, or to said further first connector.

8. A control arrangement for an elevator brake, comprising
a control circuit adapted to generate. according to a demand for releasing a first braking member of said elevator brake, a first actuating signal and to generate, according to a demand for releasing a second braking member of said elevator brake, a second actuating signal;
a first terminal for outputting said first actuating signal to a first electromagnetic actuator of said elevator brake;
a second terminal for outputting said second actuating signal to a second electromagnetic actuator of said elevator brake;
said control arrangement being adapted to allow at least the following modes of operation;
  A) a normal operation mode in which said first and said second actuating signals are supplied synchronously to said first and second electromagnetic actuation means, respectively; and
  B) a single braking member test operation mode, in which one of said first and second actuating signals is supplied to the respective one of said first and second electromagnetic actuating means, and test operation mode actuating signal for releasing the respective of said first and second braking members for a duration of the test operation mode is supplied to the other one of said first and second electromagnetic actuators;
monitoring means for monitoring releasing and engaging of said first and second brake elements, respectively;
wherein said control arrangement is adapted to suspend said monitoring means in response to a request to enter one of the single braking member test operation modes; and
wherein said control arrangement allows, in response to a request to enter one of the single braking member test operation modes, a predetermined number of runs of an elevator car to be braked by said elevator brake.

* * * * *

UNITED STATES PATENT AND TRADEMARK OFFICE
CERTIFICATE OF CORRECTION

| | |
|---|---|
| PATENT NO. | : 8,746,413 B2 |
| APPLICATION NO. | : 12/990960 |
| DATED | : June 10, 2014 |
| INVENTOR(S) | : Helmut Lothar Schroeder-Brumloop |

Page 1 of 1

It is certified that error appears in the above-identified patent and that said Letters Patent is hereby corrected as shown below:

IN THE CLAIMS:

In claim 5, column 16, line 15; "all" should read as --allow--
In claim 5, column 16, line 19; "und" should read as --and--

Signed and Sealed this
Twenty-first Day of October, 2014

Michelle K. Lee
*Deputy Director of the United States Patent and Trademark Office*